United States Patent
Kramer, Jr.

(10) Patent No.: US 6,494,474 B1
(45) Date of Patent: Dec. 17, 2002

(54) ADJUSTABLE WHEELCHAIR ANTI-TIP ASSEMBLY

(75) Inventor: DuWayne E. Kramer, Jr., Lake Quivera, KS (US)

(73) Assignee: Burke Mobility Products, Inc., Kansas City, KS (US)

( * ) Notice: Subject to any disclaimer, the term of this patent is extended or adjusted under 35 U.S.C. 154(b) by 0 days.

(21) Appl. No.: 09/430,937

(22) Filed: Nov. 1, 1999

(51) Int. Cl.[7] .............................................. B62D 61/12

(52) U.S. Cl. ................... 280/304.1; 180/209; 180/907; 280/43.2; 280/767

(58) Field of Search .......................... 280/250.1, 304.1, 280/763.1, 767, 755, 293, 301, 302, 303, 43, 43.13, 43.2, 43.21, 5.28, 5.3, 5.32, DIG. 10, 86.5, 43.22, 43.23; 180/209, 65.1, 24.02, 15, 16, 907, 22, 24.06

(56) References Cited

U.S. PATENT DOCUMENTS

| | | | |
|---|---|---|---|
| 865,514 A | * | 9/1907 | Mullenmeister ........... 280/47.2 |
| 1,392,874 A | * | 10/1921 | Johnston |
| 1,431,634 A | * | 10/1922 | Clements |
| 1,591,529 A | * | 7/1926 | Guerber ............... 280/DIG. 10 |
| 1,925,827 A | * | 9/1933 | Williams |
| 2,233,262 A | * | 2/1941 | Jacobson |
| 2,648,271 A | * | 8/1953 | Youngs |
| 3,178,193 A | * | 4/1965 | Grogan |
| 3,276,531 A | * | 10/1966 | Hale et al. |
| 3,295,858 A | * | 1/1967 | Addison, Jr. |
| 4,455,029 A | * | 6/1984 | Taylor ........................ 280/5.28 |
| 5,435,404 A | | 7/1995 | Garin, III |
| 5,518,259 A | * | 5/1996 | Hall ........................... 280/43.2 |
| 5,772,237 A | | 6/1998 | Finch et al. |
| D397,645 S | | 9/1998 | Schaffner |
| 5,944,131 A | | 8/1999 | Schaffner et al. |

OTHER PUBLICATIONS

Chauffeur Mobility Products, Viva Power Chair Owner's Manual, 24 pages, Rev. 02—Jan. 9, 1998.
Days Medical Aids Ltd., DMA Brochure, 2 pages, prior to Nov. 1998.
Everest & Jennings, The O.C. Flyer Brochure, 4 pages, prior to Nov. 1998.
Fortress, Mini Catalog, 4 pages, prior to Nov. 1993.
HomeCareXtra Catalog, pp. 32–34, Entitled, *Mobility Focus*, prior to Nov. 1998.
Hoveround Corporation, Hoveround Personal Mobility Vehicles MPV 4 Brochure, 2 pages, prior to Nov. 1998.
Hoveround Corporation, Hoveround Personal Mobility Vehicle Teknique Brochure, 2 pages, prior to Nov. 1998.
Invacare Corporation Action Simply Smart, Simply Smart, PinDot, Storm Series, Action Arrow, Action Ranger X, Action Torque, Action Range II, and Action Allegro Brochure, 6 pages, 1997.
Invacare Corporation, Action P7E Brochure, 2 pages, Form No. 97–251, 1997.
Invacare Corporation, Action Power 9000 Storm Series Brochure, 6 pages, Form 95–96, Nov. 1995.

(List continued on next page.)

Primary Examiner—Anne Marie Boehler
(74) Attorney, Agent, or Firm—Shook Hardy & Bacon

(57) ABSTRACT

An anti-tip mechanism for use with a wheelchair is provided. The anti-tip mechanism has a support frame being adapted to be coupled to the wheelchair. A first and a second wheel support arm extend outwardly from the support frame and are pivotally coupled thereto. A wheel is rotatably connected to each of the support arms. An adjusting mechanism is coupled between the frame and the support arms. The adjusting mechanism is adapted to change the position of the support arms relative to the frame. In this manner, the adjusting mechanism is adapted to raise and lower the wheels. The anti-tip wheels of the wheelchair are thus adjustable to different fixed positions relative to the support frame by operation of the adjusting mechanism.

10 Claims, 1 Drawing Sheet

OTHER PUBLICATIONS

Invacare Corporation, Action Storm Series Ranger X Brochure, 12 pages, Form No. 94–26 R020395, 1994.

Invacare Corporation, Action Storm Series Arrow & Torque Brochure, 20 pages, Form No. 94–09, 1994.

Leisure—Life, Inc., PaceSaver Sasso Power Chair Brochure, 2 pages, prior to Nov. 1998.

Merits Brochure, Sales@Merits.com.tw, prior to Dec. 27, 1999.

Permobil Inc, Chairman Corpus Brochure, 2 pages, prior to Nov. 1998.

Permobil Inc, Chairman Stander Brochure, 2 pages, prior to Nov. 1998.

Permobil Inc, Chairman MPS Brochure, 2 pages, prior to Nov. 1998.

Permobil Inc, Chairman Drivelink for Chairman Brochure, 2 pages, prior to Nov. 1998.

Permobil Inc, Chariman Miniflex Brochure, 2 pages, prior to Nov. 1998.

Permobil Inc. Chairman Mini Stander Brochure, 2 pages, prior to Nov. 1998.

Permobil Inc, Chairman Basic Brochure, 2 pages, prior to Nov. 1998.

Permobil Inc, The New Chairman Brochure, 2 pages, prior to Nov. 1998.

Permobil Inc, Chairman Robo For Kids Brochure, 2 pages, prior to Nov. 1998.

Pride Health Care, Inc., Jazzy Model 1100 Power Chair Brochure, 2 pages, prior to Nov. 1998.

Pride Health Care, Inc., Jazzy Model 1100 Power Chair Owner's Manual, 44 pages, prior to Nov. 1998.

Pride Health Care, Inc., Jazzy Model 1105 Power Chairs Brochure, 2 pages, prior to Nov. 1998.

Pride Health Care, Inc., Jazzy Model 1120 Power Chairs Brochure, 2 pages, prior to Nov. 1998.

Pride Health Care, Inc., Jazzy Model 1170 Power Chairs Brochure, 2 pages, prior to Nov. 1998.

Pride Health Care, Inc., Jazzy Power Chairs Brochure, 2 pages, prior to Nov. 1998.

Pride Health Care, Inc., Jazzy Power Chairs Brochure, 8 pages, prior to Nov. 1998.

Pride Health Care, Inc., Jazzy Power Chairs Brochure, 12 pages, prior to Nov. 1998.

Quickie Designs Inc., Quickie P210 Brochure, 2 pages, No. 903500, May 1995.

Quickie Designs Inc, Quickie P110/P100 Brochure, 2 pages, 1996.

* cited by examiner

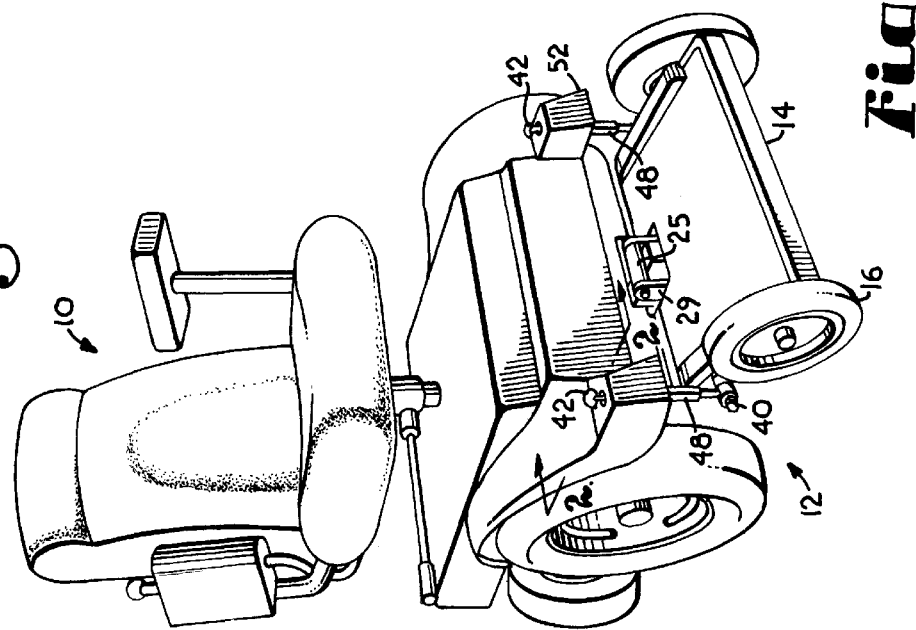

ADJUSTABLE WHEELCHAIR ANTI-TIP ASSEMBLY

STATEMENT REGARDING FEDERALLY SPONSORED RESEARCH OR DEVELOPMENT

Not Applicable.

CROSS REFERENCE TO RELATED APPLICATIONS

Not Applicable.

BACKGROUND OF THE INVENTION

The present invention relates to wheelchairs for use by disabled persons. More specifically, the present invention relates to a detachable foot support assembly that has adjustable wheels to allow it to function as an anti-tip device or to assist the wheelchair in overcoming obstacles.

A common problem associated with three-quarter drive or mid-wheel drive wheelchairs is the tendency to tip or become unstable when the wheelchair is either stopping or moving down an incline. When the unit tips, the user could fall out of the wheelchair if not supported by a seat belt, or the whole unit could tip over. This problem is typically addressed by providing a set of anti-tip wheels on either the front of the wheelchair to prevent tipping forward or on the back of the wheelchair to prevent tipping backward. These anti-tip wheels are usually located in close proximity to the ground to allow for greater stability and less space for the chair to tip.

Another common problem for wheelchair users is the difficulty of maneuvering the wheelchair over objects such as curbs or other physical barriers. When faced with a barrier that is not convenient or possible to circumnavigate, the wheelchair user can attempt to go over the barrier. However, this can result in damage to the wheelchair. For example, the front of the chair can be damaged or, if the front of the unit successfully climbs the barrier, the chair may become stuck or grounded on the barrier if the rear wheels are not able to overcome the barrier. Thus, the user is not only stranded but the wheelchair undercarriage and frame might also suffer damage.

One way to address this problem is to provide a set of wheels on the front end of the wheelchair assembly in a manner that allows the wheels to engage the barrier and assist the wheelchair in rolling over the barrier by raising the entire assembly. To perform this function, such wheels may be disposed higher above the ground than typical anti-tip wheels and are preferably adjusted to the approximate height of the typical barrier that is encountered.

This type of assembly has inherent disadvantages. For example, another deficiency of the known configurations is that in order to convert the wheels from anti-tip to barrier hurdle mode, the wheelchair must be disassembled and tools are required to make the required adjustments. Not only is this time consuming and inconvenient, but many wheelchair users cannot perform the transformation without assistance.

An attempted resolution of these problems is to provide a wheel assembly wherein the wheels are adjustable by virtue of being mounted with a resilient suspension—typically with springs. In this prior art solution, the anti-tip wheels are set in a position relatively low to the ground. This allows the wheels to serve an anti-tip function. When the wheels encounter a barrier, the springs are designed to "give," allowing the anti-tip wheels to be raised. This attempted resolution is deficient in that the spring tension in the suspension is difficult to set correctly for both situations. If not enough tension is present, the anti-tip wheels will not prevent the wheelchair from tipping, or at least severely rocking forward. If too much tension is present, the springs will not allow the wheels to raise up upon encountering a barrier, which could damage the wheelchair.

Although it is apparent that wheelchairs equipped with the resilient suspension can be set to address one of the two above-mentioned problems at any given time, it is difficult to achieve a setting that addresses both of the above-mentioned situations.

An anti-tip assembly for a wheelchair is therefore needed which will provide enough flexibility to give the chair the required range of motion to overcome obstacles and to provide anti-tip features, while at the same time being convenient and easy to adjust.

SUMMARY OF THE INVENTION

It is an object of the present invention to provide an anti-tip assembly for wheelchairs for use by disabled persons that can easily be converted from an anti-tip position to a barrier hurdle position.

It is another object of the present invention to provide an anti-tip assembly for wheelchairs that can be transformed from an anti-tip position to a barrier hurdle position without tools and by hand pressure alone.

A still further object of the present invention is to provide an anti-tip assembly for wheelchairs that can be adjusted with relative speed and ease.

According to the present invention, the foregoing and other objects are obtained by an anti-tip assembly for wheelchairs. The anti-tip assembly has a support frame being adapted to be coupled to the wheelchair. A first and a second wheel support arm extend outwardly from the support frame and are pivotally coupled thereto. A wheel is rotatably connected to each of the support arms. An adjusting mechanism is coupled between the frame and the support arms. The adjusting mechanism is adapted to change the position of the support arms relative to the frame. In this manner, the adjusting mechanism is adapted to raise and lower the wheels. The anti-tip wheels of the wheelchair are thus adjustable to different fixed positions relative to the support frame by operation of the adjusting mechanism.

Additional objects, advantages, and novel features of the invention will be set forth in part in the description which follows, and in part will become apparent to those skilled in the practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

In the accompanying drawings which form a part of the specification and which are to be read in conjunction therewith and in which like reference numerals are used to indicate like parts in the various views:

FIG. 1 is a perspective view of the foot support assembly of the present invention, shown attached to a wheelchair shown in a front wheel drive configuration;

FIG. 2 is a partial side cross sectional view taken along the line 2—2 of FIG. 1, shown with parts being broken away to show particular details of construction, and with the wheels in an elevated condition;

FIG. 3 is a view similar to FIG. 2, shown with the wheels in a lowered position; and FIG. 4 is a cross sectional view taken along line 4—4 of FIG. 2, illustrating the wheel adjuster assembly of the present invention.

DETAILED DESCRIPTION OF THE INVENTION

Referring initially to FIG. 1, there is shown a wheelchair 10 and an adjustable foot support assembly 12 that embodies the principles of the anti-tip mechanism of the present invention. Wheelchair 10 is a motorized wheelchair, as is know to those of skill in the art. The present invention is directed to an anti-tip mechanism which may be used in connection with a foot support assembly 12, which may be used on a variety of wheelchairs 10. Foot support 12 broadly includes a footplate 14 and a pair of wheels 16 that are attached to the assembly via a set of wheel arms 34, as best seen in FIG. 2.

The foot support 12 is shown in greater detail in FIGS. 2 and 3. Foot support 12 is detachably connected to the wheelchair by a square steel tube 18 extending outwardly from the wheelchair frame. Tube 18 is adapted to be received within a square steel tube center coupling 20 of foot support 12. When tube 18 is located within center coupling 20, it is held in place by passing a bolt 22 through corresponding holes in tube 18 and center coupling 20. Bolt 22 is secured in place with a coupling nut 24. Other suitable attaching mechanisms could, of course, be used to secure tube 18 within coupling 20. For example, it may be preferable to coupled tube 18 within coupling 20 with a quick-release pin, so that the foot support may be more easily removed from wheelchair 10.

As best seen in FIG. 2, a horizontally disposed cross member 26 is rigidly secured to the top surface of central coupling 20, such as by welding. Member 26 is coupled at an intermediate point, so that a portion of central coupling 20 extends beyond cross member 26. Preferably, member 26 is made of a square steel tubing. As best seen in FIG. 1, attached to the top of center coupling 20 is a plastic bolt sleeve 25. A pair of spaced frame extensions 29 are rigidly coupled to footplate 14. Extensions 29 are spaced apart, with one extension 29 being located adjacent each end of sleeve 25. A bolt 27 extends through bolt sleeve 25 and through a pair of connecting holes presented in extensions 29. This connection pivotally couples footplate 14 to foot support assembly 12. Thus, footplate 14 can pivot relative to wheelchair 10.

As best seen in FIG. 1, footplate 14 is rectangular and is preferably made from a steel frame with a cover of plastic, although other materials can be used. As best seen in FIG. 2, fixedly attached, such as by weld, to each end of cross bar 26 is a vertically extending square metal tube 28. A generally unshaped upper support arm 30 is secured by weld to the top of each end tube 28 and extends outwardly from wheelchair 10 in the direction of footplate 14. A diagonal brace 32 is rigidly secured between tube 28 and upper support arm 30. As is known to those of skill in the art, wheelchair 10 is provided with a plastic cover 52. To support cover 52, a post 51 having a flat head is rigidly attached to support arm 30 and extends upwardly therefrom. The flat head of post 51 is fitted with a hook and loop fastening material for releasably attaching and supporting cover 52.

As discussed very generally above, extending outwardly from cross bar 26 and disposed intermediate each end tube 28 and the footplate 14 is a wheel arm 34. Each wheel arm 34 is pivotally connected to tube 28 by a pivot bolt 36 passing through end tube 28, wheel arm 34 and an steel rod extending downwardly from the cross bar (not shown). As best seen in FIG. 4, wheel arm 34 further includes a horizontally disposed outwardly protruding adjuster extension 38 located at a point intermediate end tube 28 and wheel 16. Adjuster extension 38 is coupled to wheel arm 34 via a bolt 40 and a nut (not shown).

Wheel arm 34 is rotated about the axis of bolt 36 by actuating an adjuster assembly that is coupled to extension 38. The adjuster assembly includes a thumb screw 42 that extends upwardly from support arm 30 and through an aperture in plastic cover 52. Thumb screw 42 also passes though a corresponding aperture in support arm 30. Thumb screw 42 is secured to support arm 30 by a locking nut 44 and a washer 46. The portion of thumb screw 42 that extends through support arm 30 is received within and is fixedly secured to a threaded coupler 48. The lower end of threaded coupler 48 houses a threaded bolt 50. Bolt 50 is threaded within coupler 48 and has a portion that extends downwardly beyond threaded coupler 48. The lower-most end of bolt 50 is welded to wheel arm extension 38. Thus, turning thumbscrew 42 causes threaded coupler 48 to rotate. Rotation of threaded coupler 48, in turn, causes threaded bolt 50 to rotate and either extend from or retract into threaded coupler 48. Movement of threaded bolt 50 translates into movement of wheel arm 34 relative to the ground and footplate 14. Each wheel arm 34, and wheel 16, can be independently adjusted, thereby providing the wheelchair additional range and the ability to operate over a wide range of gradients and obstacles.

Received within a hole at the distal end of wheel arm 34 is an axle bolt 54 that extends through corresponding holes in wheel arm 34 and wheel 16. Wheels 16 are preferably pneumatic tires with preferably 6¼ inch diameter, it being understood that other types and sizes of wheels would also be suitable. Wheels 16 are shown as having spokes 56 and rims 58.

While the above description has illustrated the use of the anti-tip mechanism in connection with foot support assembly 12, the anti-tip mechanism described, above could also be used and coupled to wheelchair 10 without foot support 12. For example, wheel support arms 34 may be directly coupled to wheelchair 10 independently of foot support 12.

From the foregoing, it is to be understood that wheels 16 can be adjusted between an anti-tip and barrier position merely by turning thumb screws 42. Such adjustment is accomplished without disassembly of the wheelchair. Importantly, the adjustment can be performed solely with pressure from the wheelchair user's hand—without the aid of additional tools.

From the foregoing, it will be seen that this invention is one well adapted to attain all the ends and objects herein above set forth together with other advantages which are obvious and which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A wheelchair having a seat and a frame that is generally parallel to a support surface on which the wheelchair is sitting and having an anti-tip mechanism, said anti-tip mechanism comprising:

a support frame being adapted to be coupled to the wheelchair frame;

a first and a second wheel support arm extending outwardly from said support frame and pivotally coupled thereto;

a wheel rotatably connected to each of said support arms and spaced above the support surface when the support surface is generally flat;

an adjusting mechanism coupled between said frame and said support arms, said mechanism adapted to change the position of said support arms relative to said frame and relative to the seat, said adjusting mechanism thereby being adapted to raise and lower said wheels; and a footplate disposed generally parallel to the ground, said footplate being mounted to the support frame independently of said support arms, wheels and adjusting mechanism, and being adapted to receive the feet of a wheelchair user, wherein said wheels are adjustable independently of said footplate to different fixed positions relative to the support frame, the support surface and the seat by operation of said adjusting mechanism and wherein said wheels do not necessarily engage the support surface during adjustment when the support surface is generally flat.

2. The wheelchair of claim 1, wherein a pair of said adjusting mechanisms are provided, one of said mechanisms being coupled to a corresponding support arm, wherein said support arms are independently adjustable relative to one another.

3. The wheelchair of claim 2, wherein said adjusting mechanism includes a threaded rod connected between said frame and each of said support arms.

4. The wheelchair of claim 3, wherein said adjusting mechanism is adjustable solely by hand pressure.

5. The wheelchair of claim 4, further comprising a first and second thumb screw, one of said first and second screws being connected to a corresponding one of said threaded rods, wherein said wheels are vertically adjusted relative to said frame by turning said thumb screws.

6. The wheelchair of claim 5, further comprising a coupling mounted to said frame for detachably connecting said footplate to said wheelchair.

7. A motorized wheelchair having a seat and a frame that is generally parallel to a support surface on which the motorized wheelchair is sitting and having an anti-tip mechanism, said anti-tip mechanism comprising:

a support frame being adapted to be coupled to the motorized wheelchair frame;

a first and a second wheel support arm extending outwardly from said support frame and pivotally coupled thereto;

a wheel rotatably connected to each of said support arms and spaced above the support surface when the support surface is generally flat;

an adjusting means, coupled between said frame and said support arms, for adjusting the support arms relative to the support surface and the seat so that the position of said wheels may be moved between a number of fixed positions relative to the support surface and the seat; and a footplate disposed generally parallel to the ground, said footplate being mounted to the support frame independently of said support arms, wheels and adjusting means, and being adapted to receive the feet of a wheelchair user, wherein said wheels may be adjusted independently of said footplate and wherein said wheels do not necessarily engage the support surface when adjusted when the support surface is generally flat.

8. The wheelchair of claim 7, wherein said adjusting means allows the independent adjustment of said support arms relative to one another.

9. The wheelchair of claim 8, wherein said adjusting means includes at least one threaded rod connected between said frame and said support arms, said rod having a hand operable screw attached thereto, said screw being operable to raise and lower said support arms.

10. The wheelchair of claim 9, further comprising a coupling mounted to said frame for detachably connecting said foot support to said wheelchair.

* * * * *